US009299998B2

(12) United States Patent
Chun et al.

(10) Patent No.: US 9,299,998 B2
(45) Date of Patent: Mar. 29, 2016

(54) FUEL CELL MANAGEMENT METHOD

(71) Applicants: Hyundai Motor Company, Seoul (KR); Kia Motors Corporation, Seoul (KR)

(72) Inventors: Dae Keun Chun, Seoul (KR); Hwan Soo Shin, Uiwang-si (KR); Hyun Suk Choo, Yongin-si (KR); Sung Keun Lee, Suwon-si (KR); Jae Hyuk Lee, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 113 days.

(21) Appl. No.: 14/288,025

(22) Filed: May 27, 2014

(65) Prior Publication Data

US 2015/0180064 A1  Jun. 25, 2015

(30) Foreign Application Priority Data

Dec. 23, 2013  (KR) .......................... 10-2013-0161878

(51) Int. Cl.
*H01M 8/04* (2006.01)
*H01M 8/06* (2006.01)

(52) U.S. Cl.
CPC ........ *H01M 8/04231* (2013.01); *H01M 8/0606* (2013.01)

(58) Field of Classification Search
CPC .................... H01M 8/04231; H01M 8/0606
See application file for complete search history.

(56) References Cited

U.S. PATENT DOCUMENTS

| 2003/0180586 | A1* | 9/2003 | Hagans | H01M 8/04119 429/429 |
| 2005/0074641 | A1* | 4/2005 | Inai | H01M 8/04231 429/429 |
| 2006/0046106 | A1* | 3/2006 | Yu | H01M 8/04231 429/414 |
| 2008/0245588 | A1* | 10/2008 | Wake | H01M 8/04179 180/65.31 |

FOREIGN PATENT DOCUMENTS

| JP | S62-150665 A | 7/1987 |
| JP | 2004-342406 A | 12/2004 |
| JP | 2005-259526 A | 9/2005 |
| JP | 2012-185968 A | 9/2012 |
| KR | 10-2008-0091464 A | 10/2008 |
| KR | 10-2010-0086986 A | 8/2010 |

OTHER PUBLICATIONS

Cho et al., "Application of CV Cycling to the Activation of the Polymer Electrolyte Membrane Fuel Cell," Appl. Chem. Eng., vol. 23, No. 5, Oct. 2012, pp. 445-449, with English abstract.

* cited by examiner

*Primary Examiner* — Carlos Barcena
(74) *Attorney, Agent, or Firm* — McDermott Will & Emery LLP

(57) ABSTRACT

A fuel cell management method includes removing droplets remaining in a fuel cell stack using air supplied to a cathode and hydrogen supplied to an anode. Hydrogen and oxygen remaining are removed in the fuel cell stack by stopping the supply of the hydrogen and the air, and the hydrogen and the oxygen in the fuel cell stack are chemically reacted to remove residual hydrogen and oxygen. Hydrogen is generated in the cathode of the fuel cell stack after removing the residual hydrogen and oxygen. The residual oxygen is additionally removed using the generated hydrogen, the generated hydrogen is absorbed on a surface of a catalyst layer formed on the anode and cathode and accelerating the chemical reaction of hydrogen and air.

8 Claims, 4 Drawing Sheets

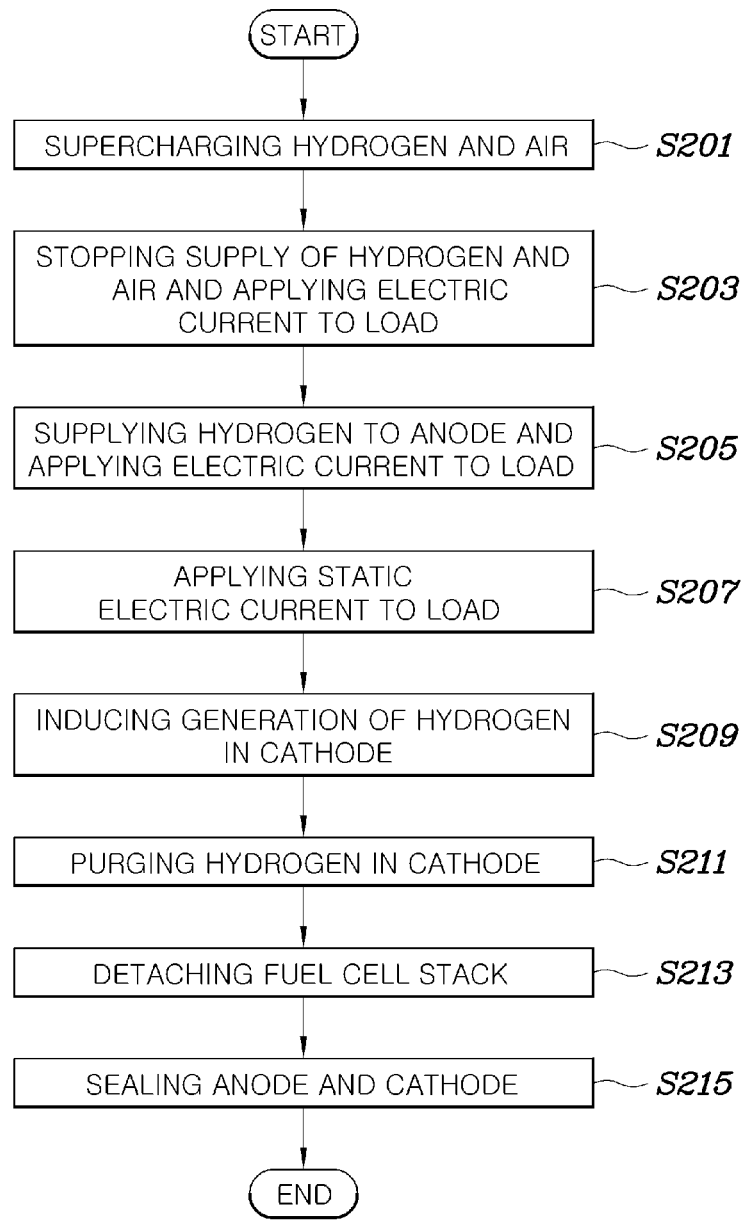

FIG.3

| CLASS. | AVERAGE VOLTAGE AFTER ACTIVATION(V) | VOLTAGE AFTER ABOUT 7 DAYS(V) | AVERAGE VOLTAGE REDUCTION (mV) | DETERIORATION RATE (%) | SHUT/DOWN AFTER ACTIVATION, STORAGE METHOD | NOVEL SHUT/DOWN, STORAGE METHOD AND PURPOSE |
|---|---|---|---|---|---|---|
| Ref. | 0.697 | 0.69 | 7 | 1.00 | COD S/D, SEALING | REMOVING RESIDUAL OXYGEN FROM CATHODE IN FUEL CELL STACK |
| 1 | 0.703 | 0.697 | 6 | 0.85 | COD S/D, PERFECT SEALING USING TOOL | PREVENTING INFLOW OF EXTERANAL OXYGEN INTO FUEL CELL STACK |
| 2 | 0.695 | 0.694 | 1 | 0.14 | COD→PURGING $H_2$ TO CATHODE (1 MINUTE), SEALING | ADSORBING $H_2$ ON PLATINUM CATALYST OF CATHODE |
| 3 | 0.697 | 0.694 | 3 | 0.43 | COD→AIR BAKING (3 MINUTES), SEALING | ADSORBING $H_2$ ON PLATINUM CATALYST OF CATHODE |
| 4 | 0.695 | 0.689 | 6 | 0.86 | COD→PURGING AIR TO ANONDE (1 MINUTE), SEALING | REMOVING RESIDUAL $H_2$ FROM SURFACE OF CATALYST OF ANODE |
| 5 | 0.694 | 0.677 | 17 | 2.45 | COD→PURGING AIR TO ANONDE AND CATHODE (1 MINUTE), SEALING | REMOVING RESIDUAL HYDROGEN FROM ANDOE AND CATHODE |

…

FUEL CELL MANAGEMENT METHOD

CROSS REFERENCE TO RELATED APPLICATION

This application claims the benefit of priority to Korean Patent Application No. 10-2013-0161878, filed on Dec. 23, 2013, which is hereby incorporated by reference in its entirety into this application.

TECHNICAL FIELD

The present disclosure relates to a fuel cell management method for preventing performance degradation occurring when storing a fuel cell stack for a long period of time.

BACKGROUND

A fuel cell is an electric power generation system for directly converting chemical reaction energy of hydrogen and oxygen included in a hydrocarbon-based material such as methanol, ethanol, natural gas, or the like into electrical energy.

Fuel cells are classified into phosphoric acid fuel cells, molten carbonate fuel cells, solid oxide fuel cells, polymer electrolyte membrane fuel cells, and the like according to the type of electrolytes. The basic principles of these fuel cells are identical to each other, but they are different from each other in terms of the type of fuels, operating temperature, catalyst, electrolyte, and the like.

Polymer electrolyte membrane fuel cells (PEMFCs) have remarkably high output performance, low operating temperature, rapid start and response characteristics, and a wide application range compared to other fuel cells.

In a fuel cell system, a substantial power-generating fuel cell stack has a laminate structure of unit cells each including a membrane-electrode assembly (MEA) and a separator provided with a gas passage. The membrane-electrode assembly is configured such that anode and cathode electrodes are attached to each other with a polymer electrolyte placed therebetween. That is, the membrane-electrode assembly has a laminate structure of a polymer electrolyte membrane, two electrodes, a catalyst layer, and a gas diffusion layer.

When hydrogen is supplied to an anode, it is oxidized into hydrogen ions and electrons by an electrochemical oxidation reaction. The hydrogen ions are transferred to a cathode through the polymer electrolyte membrane, and the electrons are transferred to the cathode through an external circuit. The hydrogen ions, which are transferred to the cathode, cause an electrochemical reduction reaction together with the oxygen supplied to the cathode to produce heat and water, and electrical energy is generated by the movement of the electrons.

After a polymer electrolyte membrane fuel cell stack is operated for a set amount of time, its performance is deteriorated due to the degradation of a platinum-carbon (Pt—C) electrode and a polymer electrolyte membrane constituting a membrane-electrode assembly (MEA). Platinum particles adjacent to a high-voltage cathode are eluted or lost by oxidation, or are dissociated by the corrosion of carbon supporting platinum, thus reducing the electrochemical surface area (ECSA). Further, carbon monoxide (several parts per million (ppm)) included in fuel is chemically adsorbed on a platinum catalyst, thus decreasing a hydrogen oxidation reaction (HOR) rate. Additionally, a local temperature increase occurring during the operation of a high-power vehicle shrinks pores of a membrane or rearranges $SO_3^-$ terminal groups, thus decreasing ion conductivity.

Further, it is known that the performance of the fuel cell stack is deteriorated during the long-term storage thereof as well as the degradation of the MEA occurring at the time of operating the high-power vehicle. That is, in the case where the fuel cell stack is stored for a long time, when air charged in the anode and cathode (air/air (anode/cathode)) is left for a long period of time, the voltage of each of anode and cathode becomes about 1.0 V. In this case, an oxide film is formed on the surface of platinum exposed to oxygen and droplets at a high voltage of about 1.0 V according to the following Chemical Formula to prevent reactive oxygen from being adsorbed on the surface of the platinum during the operation of a fuel cell, thereby decreasing a reduction reaction rate.

[Chemical Formula]

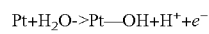

The performance deterioration of a fuel cell stack occurring during the storage thereof mostly returns to the original performance thereof through a platinum reduction procedure attributable to reversible deterioration. However, when a vehicle is operated in a state in which the oxide formed during the storage of the fuel cell stack remains on the surface of platinum, irreversible deterioration, such as the elution of platinum from oxide, is accelerated, thus deteriorating durability of the fuel cell stack for fuel cell vehicles.

It is to be understood that the foregoing description is provided to merely aid the understanding of the present disclosure, and does not mean that the present disclosure falls under the purview of the related art which was already known to those skilled in the art.

SUMMARY

The present disclosure has been devised to solve the above-mentioned problems, and an aspect of the present disclosure provides a fuel cell management method, which can decrease a reduction rate of performance of a fuel cell stack and a deterioration rate of the fuel cell stack occurring during a long-term storage thereof.

According to an exemplary embodiment of the present disclosure, a fuel cell management method includes removing droplets remaining in a fuel cell stack using air supplied to a cathode and hydrogen supplied to an anode by a controller. Hydrogen and oxygen remaining in the fuel cell stack are removed by stopping the supply of hydrogen and air and chemically reacting the hydrogen and oxygen in the fuel cell stack to remove the residual hydrogen and oxygen. Hydrogen is generated in the cathode of the fuel cell stack after removing the residual hydrogen and oxygen. The residual oxygen is additionally removed using the generated hydrogen, the generated hydrogen is absorbed on a surface of a catalyst layer formed on the anode and cathode. The catalyst layer accelerates a chemical reaction of the air and the hydrogen.

In the step of removing the droplets, the droplets may be removed by supplying dry air to the cathode, the dry air being warmed by heat generated by the application of an electric current to a stack load.

In the step of generating the hydrogen in the cathode of the fuel cell stack, the hydrogen may be generated by applying a static electric current to a stack load connected to the fuel cell stack.

In the step of generating the hydrogen in the cathode of the fuel cell stack, the hydrogen may be generated by directly purging the hydrogen to the cathode.

In the step of adsorbing the generated hydrogen on the surface of the catalyst layer, the generated hydrogen may be chemically adsorbed on the surface of the catalyst layer.

The fuel cell management method may further include sealing the anode and cathode after the step of adsorbing the hydrogen.

BRIEF DESCRIPTION OF THE DRAWINGS

The above and other objects, features and advantages of the present disclosure will be more clearly understood from the following detailed description taken in conjunction with the accompanying drawings.

FIG. 2 is a flowchart showing a fuel cell management method according to an embodiment of the present disclosure.

FIG. 3 is a table comparing the reduction rates of performance of a fuel cell stack according to various fuel cell management methods.

DETAILED DESCRIPTION

Figure 1:
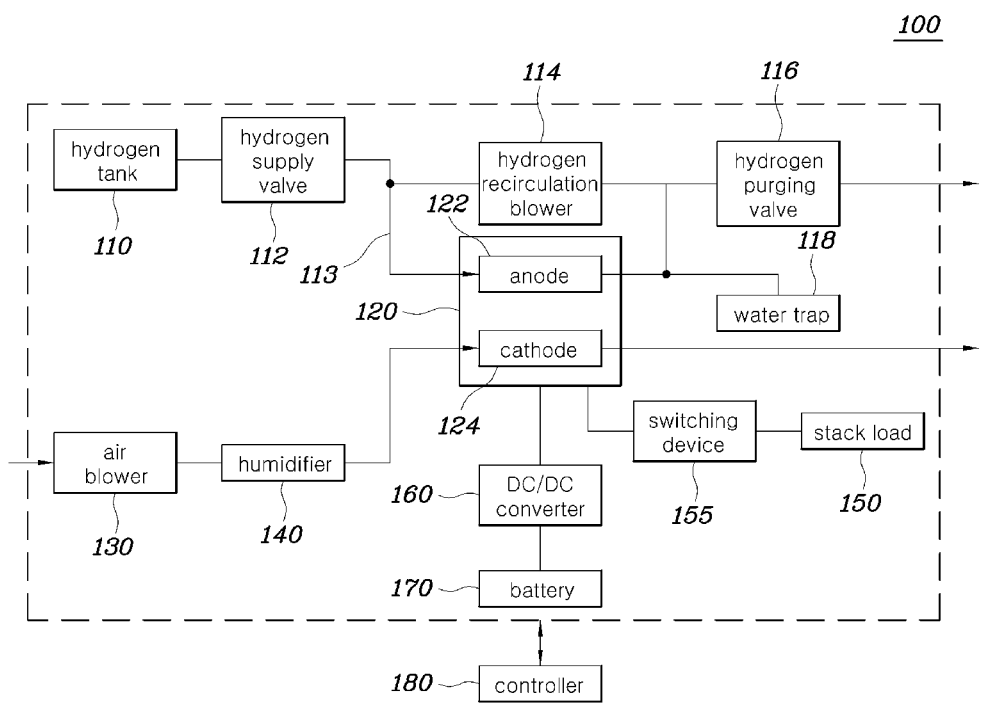
FIG. 1 is a block diagram showing a fuel cell system according to an embodiment of the present disclosure.

The present disclosure may be embodied in many different forms without departing from the spirit and significant characteristics of the disclosure. Therefore, embodiments of the present disclosure are disclosed only for illustrative purposes and should not be construed as limiting the present disclosure.

Accordingly, any and all modifications, variations, or equivalent arrangements should be considered to be within the scope of the disclosure, and the detailed scope of the disclosure will be disclosed by the accompanying claims.

The terms "first and/or second" and the like are used to differentiate a certain component from other components, but the configuration of such components should not be construed to be limited by the terms.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, exemplary embodiments of the present disclosure will be described in detail with reference to the attached drawings. Throughout the accompanying drawings, the same reference numerals are used to designate the same or similar components.

FIG. 1 is a block diagram showing a fuel cell system according to an embodiment of the present disclosure. Referring to FIG. 1, the fuel cell system 100 includes a hydrogen tank 110, a hydrogen supply valve 112, a hydrogen recirculation blower 114, a hydrogen purging valve 116, a water trap 118, a fuel cell stack 120, an anode 122, a cathode 124, an air blower 130, a humidifier 140, a stack load 150, a switching device 155, a DC/DC converter 160, a battery 170, and a controller 160.

High-pressure hydrogen in the hydrogen tank 110 is compressed and decompressed through high-pressure and low-pressure regulators (not shown), and is then supplied to the anode 122 of the fuel cell stack 120. The hydrogen recirculation blower 114 recirculates the unreacted hydrogen remaining in the anode 122 of the fuel cell stack 120 into the anode 122.

The air blower 130 draws external dry air and then supplies it to the fuel cell system 100. The supplied dry air passes through the humidifier 140 and is then supplied to the cathode 124 of the fuel cell stack 120.

The anode 122 of the fuel cell stack 120 is provided at an outlet end thereof with the hydrogen purging valve 116 for purging hydrogen. The hydrogen purging valve 116 discharges nitrogen, water, and the like accumulated in the anode 122, and the water trap 118 collects the water produced from the fuel cell stack 120 and then discharges the collected water.

The fuel cell stack 120 includes a plurality of unit cells. Each of the unit cells includes a membrane-electrode assembly (MEA) and separators disposed close to each other with the MEA placed therebetween. Each of the separators is made of a conductive plate, and is provided with flow channels for circulating the hydrogen and the air. The MEA is provided on one side thereof with the anode 122 as an oxidation electrode and is provided on the other side thereof with the cathode 124 as a reduction electrode.

The stack load 150, which is a resistance load, is connected in parallel to the outlet end of the fuel cell stack 120, and is operated by power supplied from the fuel cell stack 120 or the battery 170 according to ON-OFF-SWITCHING of the switching device 155 in response to a control signal applied from a controller 180. The stack load 150 can be used to exhaust the oxygen remaining in the cathode 124 in the course of shutdown (S/D) of the fuel cell stack and to remove the voltage of the fuel cell stack.

The DC/DC converter 160 is connected in parallel to the outlet end of the fuel cell stack 120. The DC/DC converter 160 DC/DC-converts the power output from the fuel cell stack 120 and then supplies the DC/DC-converted power to the battery 170 as a charging power, and DC/DC-converts the power output from the battery and then supplies the DC/DC-converted power to the stack load 150 and electric loads (not shown). Further, the DC/DC converter 160 DC/DC-converts regenerative braking energy generated from a drive motor (not shown) during regenerative braking and then supplies the DC/DC-converted regenerative braking energy to the battery 170 as a charging power.

When the controller 180 detects start off, the controller 180 supercharges hydrogen and air to remove the water remaining in the fuel cell stack 120, and applies a voltage to the stack load 150 to remove the droplets remaining in the fuel cell stack 120.

Further, the droplets remaining in the channels of the fuel cell stack 120 may be removed by using the air supplied to the cathode 124 of the fuel cell stack 120. In this case, the controller 180 applies an electric current to the stack load 150 to generate heat from the stack load 150. The heat generated from the stack load 150 warms air produces hot air, and the hot air is purged and then supplied into the fuel cell stack 120, thereby drying and removing the water. That is, the controller 180 can remove the droplets by supplying the dry air, which was warmed by the generated heat from the stack load 150 by applying the electric current, to the cathode 124. Or, when the controller 180 detects start off, the controller 180 can remove the water remaining in the fuel cell stack 120, that is, in the MEA, by purging the hydrogen.

Thereafter, the controller 180 stops supplying the hydrogen and air into the fuel cell stack 120, and reacts with the hydrogen and oxygen remaining in the fuel cell stack 120, thus removing the hydrogen and oxygen from the fuel cell stack 120. That is, the controller 180 removes the hydrogen and oxygen by stopping the supply of hydrogen and air into the fuel cell stack 120 and reacting hydrogen and oxygen for a set amount of time (5 to 10 seconds). As known, in an electrochemical reaction between the anode 122 and cathode 124 of the fuel cell stack 120, since oxygen is more rapidly exhausted by two times compared to hydrogen, oxygen is removed earlier. When residual oxygen is removed to the highest degree, it is possible to prevent the formation of an oxide film on a surface of platinum, the oxide film being able to be formed when the fuel cell stack 120 stops generating the power. Thereafter, the controller 180 normally supplies hydrogen to the anode 122 in the fuel cell stack 120, and stops the operation of the air blower 130, thus blocking the supply of air to the cathode 124.

The controller 180 applies the electric current generated from the fuel cell stack 120 to the stack load 150 to regulate a cell voltage not to be higher than the reference voltage which is set in order to prevent the corrosion of the anode 122 and cathode 124. When hydrogen is normally supplied to the anode 122, the oxygen remaining in the cathode 124 can be additionally removed. Thereafter, the controller 180 can induce the generation of hydrogen in the cathode 124 by applying a static electric current to the stack load 150 connected to the fuel cell stack 120. That is, when the static electric current is applied to the stack load 150 under the condition that the cathode 124 insufficiently contains oxygen and then the cell voltage is maintained at a predetermined voltage (reverse voltage) for several minutes, hydrogen ions (H$^+$), that is, protons generated from the anode 122 are reduced to hydrogen, and thus, hydrogen can be generated from the cathode 124 using "hydrogen pumping".

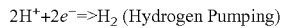

2H$^+$+2$e^-$=>H$_2$ (Hydrogen Pumping)

The hydrogen generated from the cathode 124 can be chemically adsorbed on the surface of a catalyst of the cathode 124. The chemically-adsorbed hydrogen can prevent an oxide from being formed on the surface of the catalyst even when oxygen is externally introduced into the fuel cell stack 120.

Further, the controller 180 can additionally purge hydrogen to the cathode 124. For this purpose, the controller 180 allows a hydrogen supply line 113 to be connected to an inlet of the cathode 124 instead of the inlet of the anode 122, thus directly purging hydrogen to the cathode 124.

The hydrogen directly purged to the cathode 124 may be chemically-adsorbed on the surface of a platinum catalyst formed on the cathode 124. That is, among the catalyst layers formed on the anode 122 and the cathode 124 to accelerate the electrochemical reaction of the hydrogen and air, when the purged hydrogen is chemically adsorbed on the surface of the catalyst layer formed on the anode 124, it is possible to prevent the oxide from being formed on the surface of the catalyst layer even though air flows into the anode 122. After the chemical adsorption of hydrogen, the anode 122 and cathode 124 are detached, sealed, and stored.

FIG. 2 shows a flowchart of a fuel cell management method according to an embodiment of the present disclosure. Referring to FIGS. 1 and 2, the controller 180 controls the hydrogen supply valve 112 and the air blower 130 to supercharge the hydrogen and the air to the anode 122 and cathode 124 of the fuel cell stack 120, respectively (S201). The supercharged hydrogen and air push the droplets (water) remaining in the fuel cell stack 120 to remove them from the fuel cell stack 120 (S203). In this case, an electric current is applied to the stack load 150 to operate the stack load 150 to generate heat, the generated heat warms the air, and the warmed air is purged to be supercharged into the fuel cell stack 120, thereby drying the existing water in channels of the fuel cell stack 120 to remove it.

Thereafter, the controller 180 controls the hydrogen supply valve 112 and the air blower 130 to stop the supply of hydrogen and air to the anode 122 and cathode 124. Further, the hydrogen and oxygen remaining in the fuel cell stack 120 are electrochemically reacted to remove the hydrogen and oxygen in the fuel cell stack 120 (S203). The oxygen remaining in the fuel cell stack 120 reacts with hydrogen to thermally deplete the power generated from the stack load 150, thus removing the oxygen remaining in the cathode 124 of the fuel cell stack 120 and removing a cell voltage (cathode oxygen depletion (COD) shutdown).

Thereafter, when the minimum cell voltage of cell voltage reaches a predetermined cell voltage (V1), the controller 180 controls the hydrogen supply valve 122 to supply hydrogen to the anode 122 again, and applies an electric current to the stack load 150 to decrease the cell voltage to a predetermined cell voltage (V2) (S205). The controller 180 then applies a static electric current to the stack load 150 to completely remove oxygen from the cathode 124 (S207) and to induce the generation of hydrogen in the cathode 124 (S209). Further, the hydrogen supply line 113 is connected to the inlet of the cathode 124 instead of the inlet of the anode 122, thus directly purging the hydrogen to the cathode 124 (S211).

Both the step (S209) of inducing the generation of hydrogen in the cathode 124 and the step (S211) of directly purging hydrogen to the cathode 124 may be performed, or either of the steps (S209 and S211) may be performed.

The purged hydrogen or the hydrogen charged in the cathode 124 may be chemically adsorbed on the surface of a catalyst layer for accelerating the reaction of hydrogen and oxygen. After the chemical adsorption of hydrogen, the fuel cell stack 120 is detached (S213), and the anode 122 and cathode 124 are sealed (S215).

It is obvious that this fuel cell management method 200 can be applied to the long-term storage or parking of a vehicle after the production of the fuel cell stack 120, as well as the short-term shutdown of a vehicle.

Figure 4:
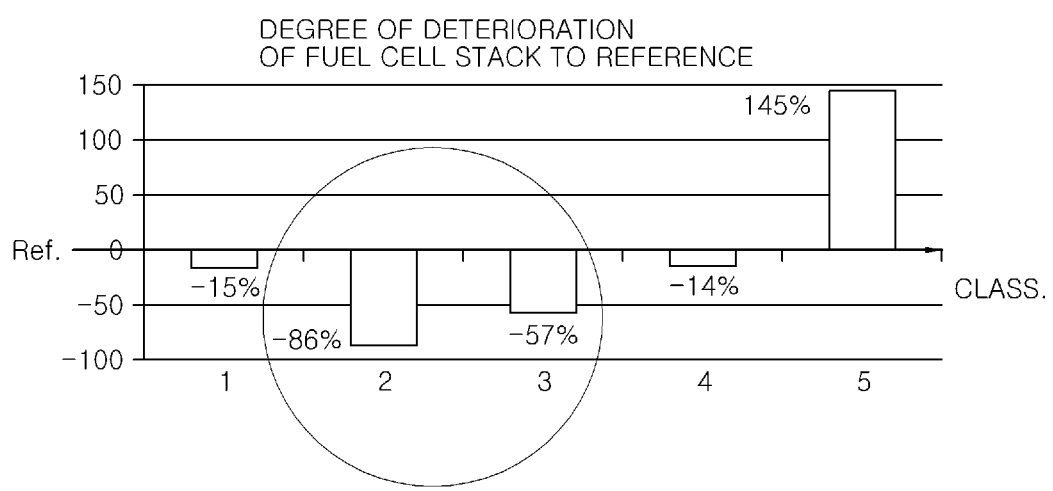
FIG. 4 is a graph showing the degree of deterioration of a fuel cell stack to a reference according the various fuel cell management methods of FIG. 3.

FIG. 3 shows a table comparing reduction rates of performance of a fuel cell stack according to various fuel cell management methods, and FIG. 4 shows a graph of the deterioration degree of a fuel cell stack to a reference according the various fuel cell management methods shown in FIG. 3.

Referring to FIGS. 3 and 4, the reference represents a fuel cell management method including only the step of COD shutdown and the step of sealing the anode and cathode. In addition, there are several fuel cell management methods, each including the steps of completely sealing the anode and cathode using a tool after COD shutdown, purging hydrogen to the cathode, inducing the generation of hydrogen in cathode (air braking), purging air to the anode, and purging air to the anode and cathode. FIGS. 3 and 4 show the average voltages after activation, voltages after 7 days, differences thereof and deterioration rates according to these fuel cell management methods.

Among these fuel cell management methods, the numbers 2 and 3 represent the fuel cell management method of the present disclosure. Referring to FIG. 4, when the hydrogen supply line 113 is connected to the inlet of the cathode 124, and hydrogen is purged to the cathode 124 for 1 minute, it can be ascertained that the hydrogen is adsorbed on a platinum catalyst of the cathode 124, and the voltage reduction after 7 days is only 1 mV. The deterioration rate thereof is only 0.14%, which is −86% of the reference.

Further, FIG. 4 shows that when the fuel cell management method including the steps of applying a static electric current to the stack load 150 for 3 minutes, not connecting the hydrogen supply line 113 to the inlet of the cathode 124, to induce the generation of hydrogen in the cathode 124 and chemically adsorbing the generated hydrogen on the platinum catalyst is used, it can be ascertained that the voltage reduction after 7 days is only 3 mV, and the deterioration rate thereof is only 0.43%, which is −57% of the reference.

Consequently, according to the fuel cell management methods of the present disclosure, it can be ascertained that the reduction rate of performance of the fuel cell stack 120 is not greatly changed even after several days, and the degree of deterioration thereof is very low.

Although the exemplary embodiments of the present disclosure have been disclosed for illustrative purposes, those skilled in the art will appreciate that various modifications, additions, and substitutions are possible, without departing from the scope and spirit of the disclosure as disclosed in the accompanying claims.

What is claimed is:

1. A fuel cell management method, comprising steps of:
   removing, by a controller, droplets remaining in a fuel cell stack using air supplied to a cathode and hydrogen supplied to an anode;
   removing hydrogen and oxygen remaining in the fuel cell stack by stopping the supply of hydrogen and air and chemically reacting the hydrogen and oxygen in the fuel cell stack to remove the residual hydrogen and oxygen;
   generating hydrogen in the cathode of the fuel cell stack after removing the residual hydrogen and oxygen; and
   additionally removing the residual oxygen using the generated hydrogen and adsorbing the generated hydrogen on a surface of a catalyst layer formed on the anode and the cathode and accelerating the chemical reaction of the air and the hydrogen.

2. The fuel cell management method of claim 1, wherein, in the step of removing the droplets, the droplets are removed by supplying dry air to the cathode and the dry air is warmed by heat generated by the application of an electric current to a stack load.

3. The fuel cell management method of claim 1, wherein, in the step of generating the hydrogen in the cathode of the fuel cell stack, the hydrogen is generated by applying, by the controller, a static electric current to a stack load connected to the fuel cell stack.

4. The fuel cell management method of claim 1, wherein hydrogen is further purged to the cathode.

5. The fuel cell management method of claim 1, wherein, in the step of adsorbing the generated hydrogen on the surface of the catalyst layer, the generated hydrogen is chemically adsorbed on the surface of the catalyst layer.

6. The fuel cell management method of claim 1, further comprising a step of sealing the anode and the cathode after the step of adsorbing the hydrogen.

7. The fuel cell management method of claim 1, further comprising, before the step of removing the droplets, supercharging, by the controller, the hydrogen and the air to the anode and the cathode.

8. The fuel cell management method of claim 1, wherein, in the step of removing the droplets, the controller controls a hydrogen supply valve and an air blower to stop the supply of the hydrogen and the air.

* * * * *